J. S. STARLING.
THRESHING MACHINE.
APPLICATION FILED OCT. 11, 1915. RENEWED JAN. 22, 1921.

1,395,611.

Patented Nov. 1, 1921.

Inventor
James Sidney
Starling

Witnesses
Edna K. Booth
Eric Schings

By
Frank Keifer
Attorney

J. S. STARLING.
THRESHING MACHINE.
APPLICATION FILED OCT. 11, 1915. RENEWED JAN. 22, 1921.

1,395,611.

Patented Nov. 1, 1921.
8 SHEETS—SHEET 4.

Witnesses
Edna K. Booth.
Eric Ischinger

Inventor
James Sidney Starling
By Frank Keifer
Attorney

J. S. STARLING.
THRESHING MACHINE.
APPLICATION FILED OCT. 11, 1915. RENEWED JAN. 22, 1921.

1,395,611.

Patented Nov. 1, 1921.
8 SHEETS—SHEET 6.

J. S. STARLING.
THRESHING MACHINE.
APPLICATION FILED OCT. 11, 1915. RENEWED JAN. 22, 1921.

1,395,611.  
Patented Nov. 1, 1921.  
8 SHEETS—SHEET 8.

UNITED STATES PATENT OFFICE.

JAMES SIDNEY STARLING, OF NORTH TONAWANDA, NEW YORK.

THRESHING-MACHINE.

1,395,611. Specification of Letters Patent. Patented Nov. 1, 1921.

Application filed October 11, 1915, Serial No. 55,299. Renewed January 22, 1921. Serial No. 439,317.

*To all whom it may concern:*

Be it known that I, JAMES SIDNEY STARLING, a citizen of the United States, residing at North Tonawanda, in the county of Niagara and State of New York, have invented certain new and useful Improvements in Threshing-Machines, of which the following is a specification.

The object of this invention is to provide a new and improved threshing machine for flax.

This and other objects of the invention will be fully illustrated in the drawings, described in the specification and pointed out in the claims at the end thereof.

In the drawings,

Figure 1 is a top plan view of the machine, partly broken away at the right hand end.

Fig. 1ᴬ is a detail view of the right hand end of the machine, showing a part that is missing from Fig. 1.

In the drawings like reference numerals indicate like parts.

In the drawings reference numeral 1 indicates the hopper at the rear end of the machine in which the flax straw is placed preparatory to feeding it to the machine. This hopper has an inclined bottom 2 which tends to feed the straw by gravity forward to the machine. The forward vertical end of the hopper is cut away at 3 to form an opening through which the straw is fed. Above this opening is placed the adjustable shield 4 which may be raised or lowered and clamped in any desired position for the purpose of varying the size of the opening through which the straw is fed. In the bottom of the hopper are the slots 5, 5 to which work the upright pins 6, which pins are carried forward to feed the straw by a mechanism that will now be described.

Figures 4, 5:
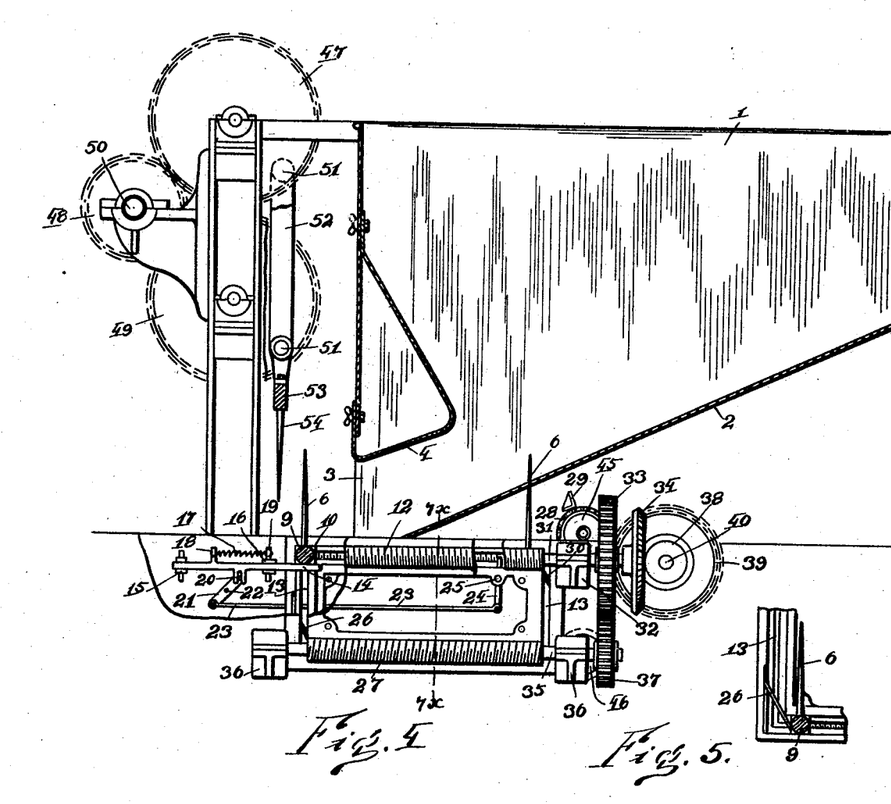
Fig. 4 is a longitudinal section through the hopper on the line 4ˣ—4ˣ of Fig. 1.
Fig. 5 is a detail view of the forward end of the lower worm, shown in Fig. 4, and a spring for coöperating therewith in the return of the feeding bars.
Figure 6:
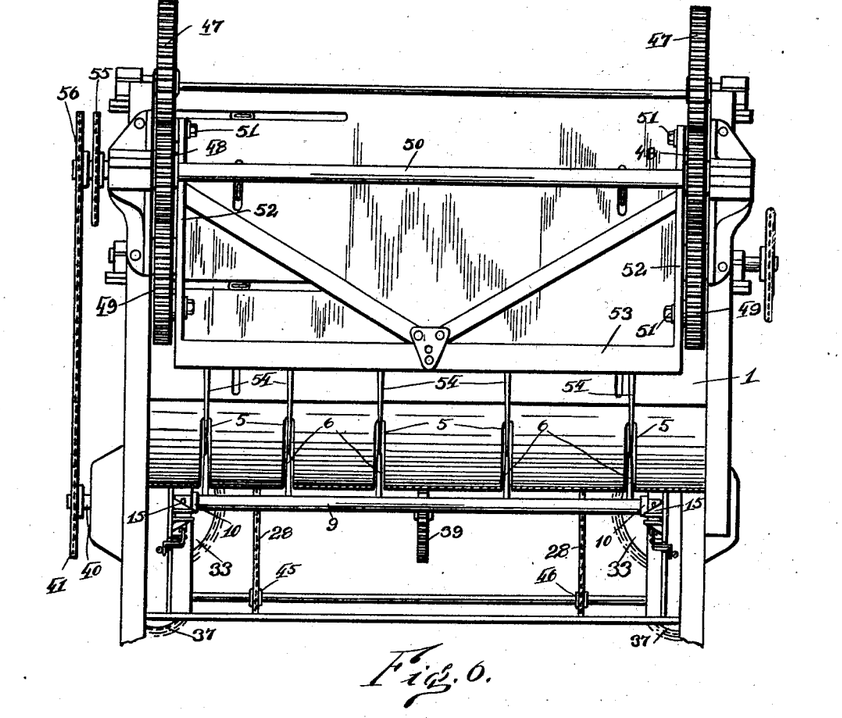
Fig. 6 is an elevation of the hopper looking at it from the left hand end of Fig. 4.
Figure 7:
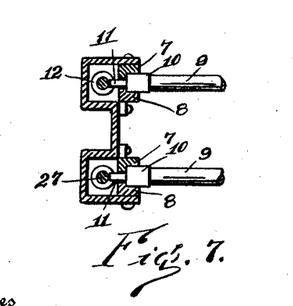
Fig. 7 is a cross section of the line 7ˣ—7ˣ of Fig. 4.
Figure 8:
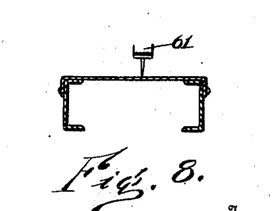
Fig. 8 is a cross section through the table taken on the line 8ˣ—8ˣ of Fig. 1.
Figures 9, 10:
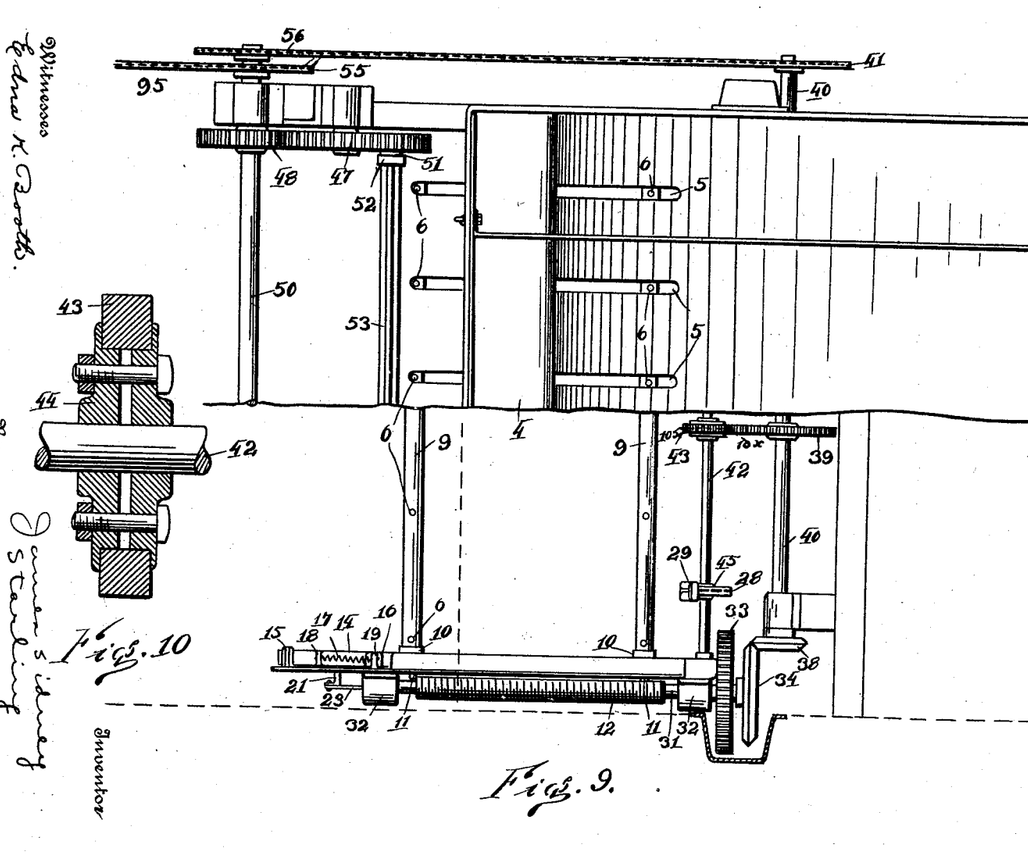
Fig. 9 is a top plan view of the hopper partly broken away.
Fig. 10 is a cross section through the clutch operating a part of the feeding mechanism of the hopper, the section being taken on the line 10ˣ—10ˣ of Fig. 9.

On opposite sides of the machine are placed the guides 7 and 8 between which the bars 9 that support the pins 6 travel. These bars have rectangular ends 10 which keep the bars from turning and keep the pins 6 in an upright position. On the opposite ends of the bars are the pins 11 which engage with the revolving worm or screw 12 and by which they are fed forward along the hopper. When these bars reach the forward end of their travel, they are transferred from the upper guides to the lower guides along which they are moved to the rear end of the hopper. For the purpose of this transfer the vertical guides 13 are provided along which the bars can pass downwardly. The bars 9 are supported in the upper guide by the releasing device 14 which consists of the bar that moves longitudinally to itself and transversely to the upper guide, which bar is mounted to slide in the guides 15 and 16 and is held in the position shown in Fig. 4, by means of a spring 17, one end of which is attached to the lug 18 on the sliding bar, the other end of which is attached to the lug 19, which is rigid with the frame of the machine. On the bottom of the bar is the fork 20, in the slot of which engages a pin carried on the upper end of the lever 21 pivoted on the pin 22. The lower end of this lever is connected with the releasing rod 23, which in turn is pivoted to the end of the lever 24 pivotally mounted on the frame at 25. The upper end of this lever projects into the path of this bar 9 by the forward movement of which the lever is tripped and the releasing device is operated to permit the bar, at the end of the guides to drop. At the bottom of the vertical guide is placed a deflecting spring 26 which throws the bar 9 forward into the lower set of horizontal guides along which it is carried rearwardly by means of the worm 27 to the rear end of the guide. When the bar reaches the rear end of the lower guides it is lifted to the upper guide by means of the chain conveyer 28 having a dog 29 thereon which engages with the bar and lifts it along the vertical guide and when it reaches the top thereof it is thrown forward along the horizontal guide by the deflecting spring 30.

Two of the bars 9 are provided and it will be understood that when one of them reaches the end of the worm 12, it will remain in that position until the other bar has traveled far enough along the worm 12 to trip the releasing device, whereupon the first bar will drop to the plane of the lower worm 27. Until the first bar 9 drops, it serves to hold back the flax that is back of it and in the hopper, permitting the yoke 53 and the pins 54 to draw forward the flax that is in front of the pins 6 and thus separate the flax, securing a more advantageous feeding of the straw.

It will be understood that flax straw, before the seed has been removed therefrom, has a tendency to cling together and the feeding device is intended to operate in a manner to overcome this tendency and separate the straw. It will also be understood that the feed of the straw will not be continuous, but will be intermittent.

Various parts of this mechanism are driven as follows: The worm 12 has integral therewith the shaft 31 mounted in the bearings 32 on which is the gear wheel 33 and on the end of which is the bevel gear 34. The lower worm 27 is integral with the shaft 35 mounted to rotate in the bearings 36, on the end of which shaft is the gear wheel 37 which meshes with the gear 33. It will be noticed that the gear 33 is considerably larger in diameter than the gear 37 which will give the gear 37 a higher angular velocity than the gear 33 and will also rotate it in the reverse direction. This in turn will make the worm 27 feed backward comparatively faster than the worm 12 moves forward.

The bevel gear 34 meshes with the beveled gear 38 which in turn is integral with the spur gear 39. The spur gear 39 is mounted on the shaft 40 which extends clear across the machine and is driven by the sprocket wheel 41 on the far end thereof. Parallel to the shaft 40 is the shaft 42 on which is mounted a pinion 43, the friction clutch 44 being interposed between the pinion and shaft by which it is yieldingly driven. Mounted on the shaft 42 are the sprocket wheels 45 and 46 around which travel the chains 28. Below the sprocket wheels 45 and 46 are suitably mounted similar sprocket wheels between which the sprocket chains 28 are supported.

By the mechanism just described, the pins 6 are carried both forward and back while retaining an upright position, and as they move forward they feed the straw forward and out of the hopper and before they are returned they are withdrawn from engagement with the straw and move rearwardly on a lower plane, after which they are again elevated into engagement with the straw in the hopper and again moved forward.

It will be understood that when the bars 9 are lifted to the plane of the worm 12, they will be abruptly arrested in their upward movement by the guide 7 and held there momentarily before the spring 30 can act to throw them forward into engagement with the worm and out of engagement with the dog 29. Until the bar 9 has been thrown out of engagement with the dog 29, the dog 29 and the chains 28 will be momentarily arrested as well and for the purpose of avoiding interference with the movement of the other parts of the machine or the breakage of any of the parts, the clutch 44 is provided, on which the pinion 43 will slip. When the pinion 43 slips on the clutch, it will cease to drive it and the clutch and shaft 42 and the sprockets 45 and 46 and chains 28 can remain at rest until the bar 9 has passed out of engagement with the dogs, after which the dogs 29 and chains 28 will be free to travel and will again be driven with the pinion 43 by the clutch 44.

Immediately in front of the hopper is placed a feeding mechanism which will now be described.

Figures 1, 1A:
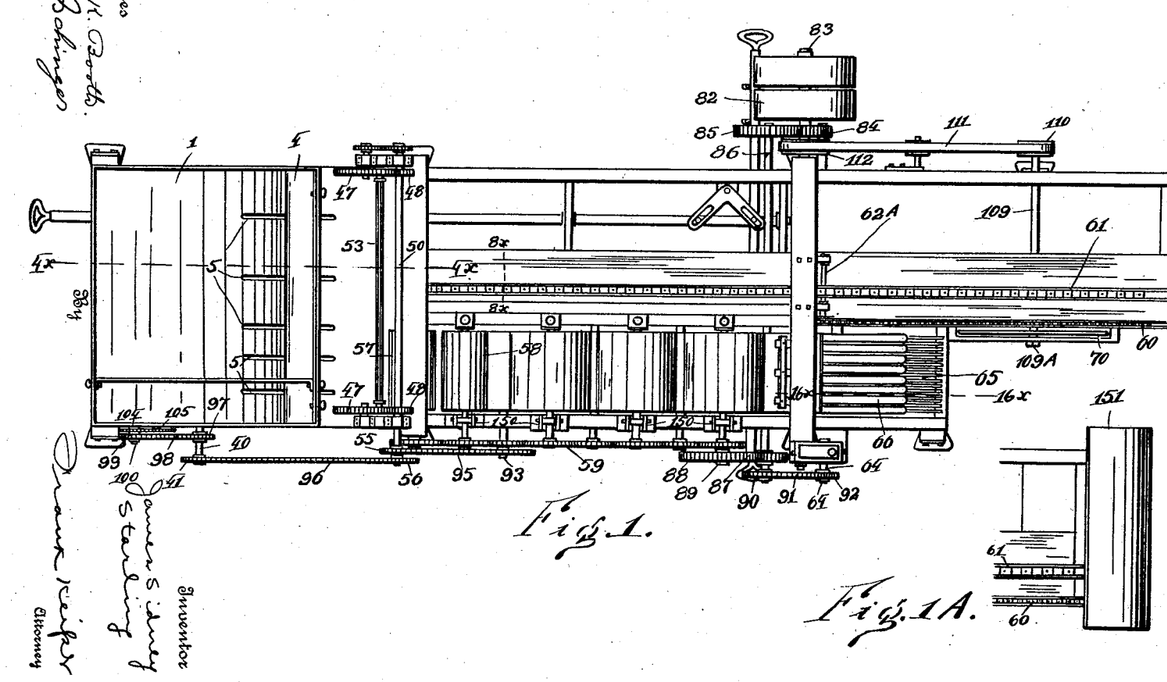
Figure 2:
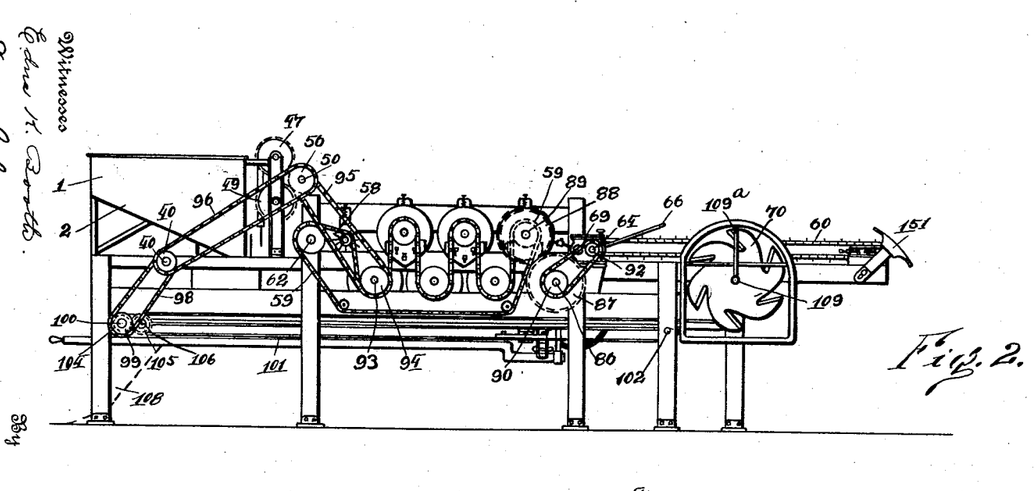
Fig. 2 is a side elevation of the right hand side of the machine shown in Fig. 1.
Figure 3:
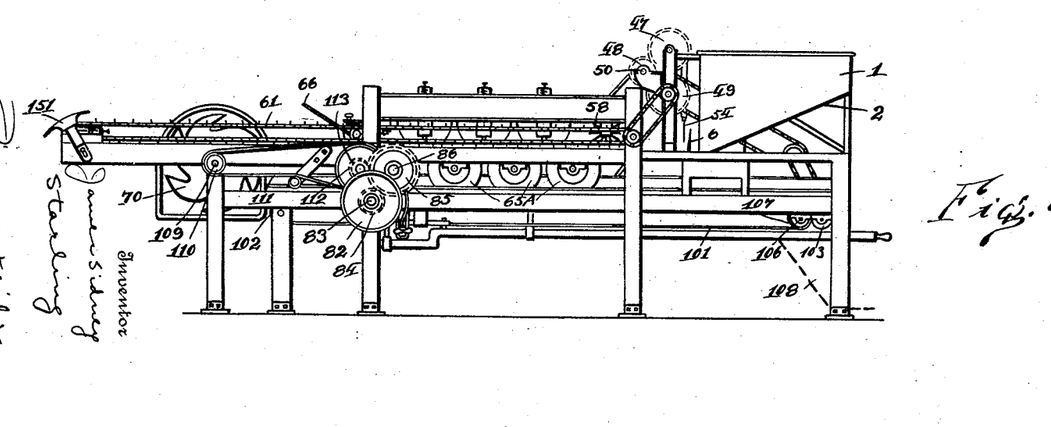
Fig. 3 is a side elevation of the left hand side of the machine as shown in Fig. 1.

At the top on each side of the machine are placed the gears 47 which in turn mesh with the idle gears 48 which in turn drives the gears 49. The pinions 48 are rigid with the shaft 50, which shaft extends clear across the machine, while the gears 47 and 49 are mounted on studs which project outwardly therefrom to the frame of the machine, leaving a space between the pairs of gears 47 and 49 open. On each of the gears 47 and 49 are pins 51, 51, between which pins are supported the side members 52 of the yoke 53, one of these side members being provided on each side of the machine and for each pair of gears. On the yoke 53 is mounted the downwardly projecting pins 54. The yoke 53 and pins 54 all move with orbital motion forward on the lower half of this movement and rearward on the upper half of this movement. As will be seen in Fig. 1, five slots are provided in the bottom of the hopper, for each of which slots one of the pins 6 will be provided. The pins 54 will travel in line with the pins 6 so that five of the pins 54 will be provided to correspond with the five pins 6. It will be understood that the pins 54 will feed the stock after the pins 6 have carried it to the end of its travel.

Two sprockets 55 and 56 are provided on the shaft 50, the sprocket 55 being driven from the main driving shaft of the machine and the sprocket 56 transmitting the power to the sprocket 41 on the shaft 40.

The pins 6 and 54 feed the straw forward along the horizontal platform, above which is placed two spreading rollers, having radial blades which operate to separate the straw from the mass in which it is fed forward from the hopper and spread it out to a comparatively even thin layer. Each spreading roller is numbered 57 and 58. The roller 57, which first engages with the straw has a large sprocket wheel, while the roller 58 has a small sprocket wheel and both have the same number of blades and the same diameter. It will be understood that both of these sprocket wheels are driven by the same sprocket chain 59 so that their peripheral velocity will be the same but their angular velocity will be inverted. It will also be seen by an inspection of Figs. 1 and 11 that the rollers 57 and 58 extend less than half way across the feeding table of the machine and are intended only to operate on the end of the straw in which the seed bolls are carried.

Above and along the middle of the table operate two chain conveyers 60 and 61, having pins thereon, the chain 61 extending between the shaft 62 and the roller 63, and the chain 60 extending between the shaft 62$^A$ and the roller 63. The shaft 62$^A$ carries a sprocket thereon that engages with and is driven by the chain 61 and in turn carries a sprocket that drives the chain 60. These chains 60 and 61 move at the same speed. They also move at substantially the same speed as the periphery of the lower threshing cylinders 65$^A$. It will be understood that the feeding table of the machine is L shaped and extends the full length of the machine on one side and is cut away after or beyond the spreading rollers 57 and 58. The straw rests upon the feed table during the whole of its forward travel and is drawn along by the teeth on the chains which project downwardly into the straw, while the seed bolls rest on the feed table until after they have passed the spreading rollers. Beyond this point the feed table is cut away and the seed bolls are fed between a series of threshing cylinders, four being mounted to rotate below the feed table and three of them mounted to rotate above the feed table, and between these threshing cylinders the flax seed is threshed out from the straw. The cylinders of the upper and lower series are of substantially the same diameter, but the sprockets are adapted to drive the upper cylinders at a somewhat greater angular velocity than the lower cylinders. It will be understood that all of the threshing cylinders are driven by the same sprocket chain 59 that drives the feeding rolls.

Figures 17, 18, 19:
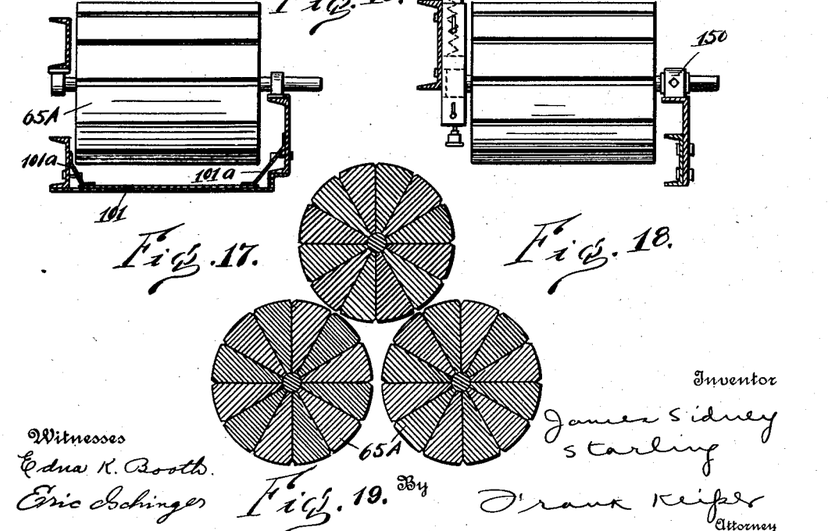
Fig. 17 is a detail view of one of the lower threshing rollers.
Fig. 18 is a detail view of one of the top rollers of the threshing machine.
Fig. 19 is a sectional view through three of the threshing rollers.

By driving the upper cylinders at a somewhat greater velocity than the lower cylinders, the bolls are not only crushed but rubbed as well, which increases the tendency to separate the seeds from the bolls. To still further increase this rubbing effect, the cylinders are grooved at regular intervals as shown in Fig. 19.

These cylinders are built up of segments of wood formed so that the grain of the wood will run in substantially the same direction with respect to the radius, securing uniform wear on the periphery of the cylinder and an easy replacement of any segment which shows excessive wear. These cylinders can be turned down from time to time as the wear on them makes it necessary and to adjust the cylinders so that they are in proper relation with each other with their changing diameters, the brackets 150 are provided which support the trunnion bearings in which the driving end of the upper cylinders are mounted to rotate. The other end of the cylinder is mounted to rotate in a box which is free to rise and fall in vertical guides, as shown in Fig. 18, being held down by the springs which permit them to yield vertically. These cylinders are staggered with reference to each other so that the cylinders make contact at a greater number of points and have a better spreading effect on the straw.

As the straw is carried to the cylinders it is held in place by reason of the fact that only the seed bolls are exposed to the cylinder and the straw paper is clamped between the feed chains and the feed table, it being understood that the straw is below the feeding chains and not above it. After the straw has passed the last of the cylinders, it passes over a grate 65, which grate consists of a series of bars which are loosely mounted at their ends and are free to turn. Bars of small diameter and preferably of gas pipe are used for this purpose and they are spaced not more than $\frac{1}{4}''$ apart. The bars are mounted so that they are free to turn to facilitate the cleaning of the grate because the material can be more easily passed therethrough and detach itself from the bars if it is inclined to adhere thereto. On this grate the seed bolls are subjected to a whipping action by beaters 66 that are mounted to oscillate, this whipping motion being secured from a crank mounted to rotate with the shaft 64, which in turn engages with the link 67. which in turn engages with the crank 68 on the shaft 69, rotating the shaft 64, causing the shaft 69 to oscillate. The beaters 66 are clamped to the shafts 69 and rock therewith, and as they are rocked, the seed bolls are subjected to a whipping action. The beaters are preferably made of wood; oval shape below and flat above and are about 1" in width. Extending rearwardly from the shaft 69 are three arms on which are carried adjustable lead weights by which the beaters are counterbalanced.

As the straw is carried beyond the beaters by the feed chains, the end of the straw that carries the seed bolls and the bushy tops of the straw comes into contact with the revolving knife 70 by which the empty seed bolls and tops are cut from the straw upon which they fall into the hopper 71 by which they are discharged onto the conveyer belt 72 which operates on a lower level of the machine than the feed table and by which it is carried forward in the machine. The knife 70 has a series of eccentric cutting edges thereon which are intended to make a draw or shearing cut on the straw, the cut beginning on the periphery of the knife and progressing toward the center. This knife works against a ledger blade on the edge of the table, integral with which is an arm that extends out around the forward side of the knife, this arm forming a guard for the knife. This knife is keyed on the shaft 109. Fastened to this shaft is a bar 109ª extending radially therefrom that revolves therewith and passes just outside of the guard, once each revolution. This bar brushes off the straw from the guard and prevents the accumulation of it on the guard, where it would interfere with the rotating of the knife and cause it to bind. The straw that remains after the seed boll has been cut therefrom is carried along the feed table by the conveyer chains 60 and 61 and is discharged over the forward end of the feed table onto the belt 73 which moves transversely to the feed chains and is mounted on a level that is intermediate between the feed table and the conveyer belt 72. A deflecting shield 151 is mounted over the end of the table, which shield deflects the straw and guides it to the position on the belt below. This shield can be set in any desired angular position.

By the conveyer belt 72 the short ends of the straw with the empty seed bolls are carried forward and discharged into a chute 74, which in turn discharges it into a series of breaking rollers 75, between which they are passed, five pairs of rollers being preferably shown for this purpose by which the straw is crushed and broken up and made into an upholstering tow. After emerging from the breaking rolls the straw is discharged onto another belt conveyer 76 which conveys it to a hopper 77.

Figures 11, 13:
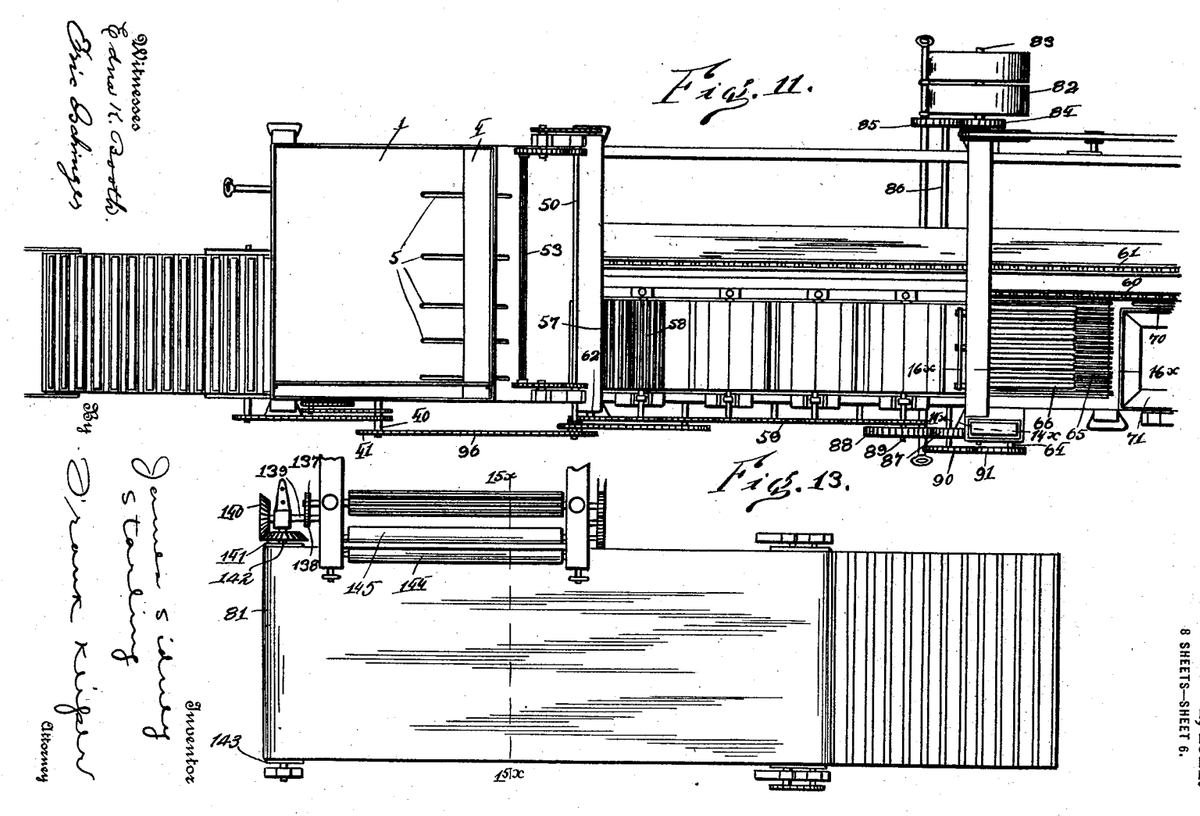
Figs. 11, 12 and 13 together show a top plan view of the complete machine, Fig. 13 showing the parts that are omitted from the lower end of Fig. 12.
Figures 12, 14:
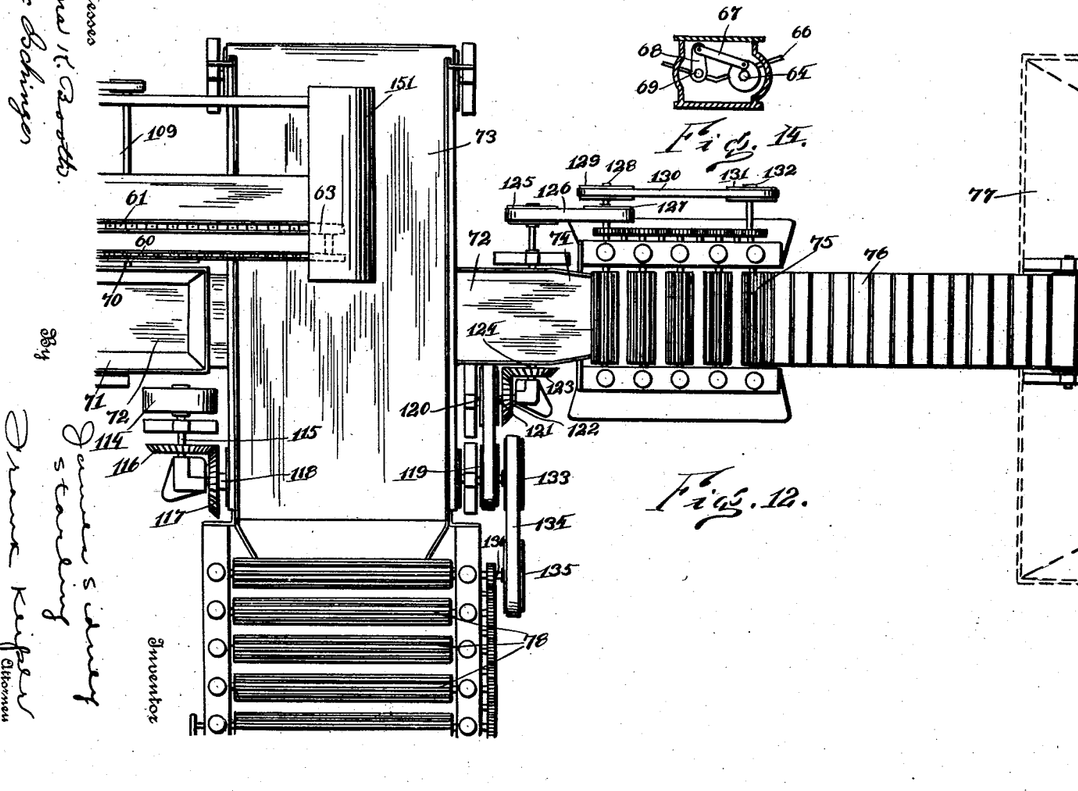
Fig. 14 is a vertical section on the line 14ˣ—14ˣ of Fig. 11 showing the mechanism for operating the beaters.
Figure 15:
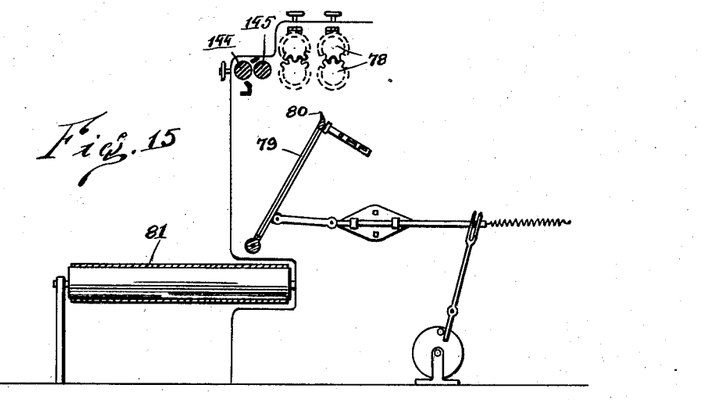
Fig. 15 is a vertical section taken on the line 15ˣ—15ˣ of Fig. 13.
Figure 16:
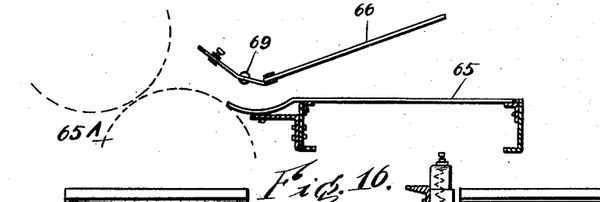
Fig. 16 is a vertical section taken on the line 16ˣ—16ˣ of Figs. 1 and 11.

The belt 73 carries the long straw endwise to the breaking rollers 78 by which the straw is broken and the shives are separated from the fiber and the dirt is separated from the roots and the roots are even separated from the straw, five pairs of these breaking rollers being illustrated in the Figs. 12 and 13. As the straw emerges from between the last pair of breaking rolls, it hangs down therefrom as in the form of a matting. Below the last pair of breaking rolls is mounted the spring shifter 79 having a knife 80 at the top thereof, which is intermittently swung forward and operates to cut the web of straw and lay it flat upon the conveyer belt 81 by which it is carried forward.

Power is applied to the machine by the main driving pulley 82, which pulley is keyed to the jack shaft 83 with which it rotates. On this jack shaft is a pinion 84 that drives the gear 85, keyed to the shaft 86 on which is mounted one of the lower threshing cylinders. On the other end of this shaft is the gear 87 which in turn meshes with the gear 88 which is keyed to the shaft 89 on which another threshing cylinder is mounted. A sprocket chain 59 is driven from the sprocket wheel keyed to the shaft 89, this chain coupling six of the threshing cylinders and the two spreading rollers for simultaneous rotation. On the shaft 86 is the sprocket wheel 90 with which engages the sprocket chain 91 which in turn engages the sprocket wheel 92 keyed to the shaft 64. On the shaft 93 of the rearmost threshing cylinder of the lowest series is mounted the sprocket wheel 94 which drives a sprocket chain 95 which engages with the sprocket wheel 55 on the shaft 50 by which it is driven.

On this shaft is the sprocket wheel 56 around which travels the sprocket chain 96 driving the sprocket wheel 41 on the shaft 40. On this shaft 40 is the sprocket wheel 97 which drives the sprocket chain 98 which engages with the sprocket wheel 99 on the shaft 100, on which shaft is mounted a roller 103. On the shaft 100 is mounted a pinion 104 which meshes with a pinion 105 on the shaft 106, on which shaft is carried a roller 107, around which travels the endless belt conveyer 101, which conveyer, at its opposite end travels around the roller 102. Fastened to the frame on either side of the belt conveyer 101 are the guards 101ª, which project over the sides of the belt and prevent the seed from spreading over the sides of the belt and working around under the belt. These guards are held in place by bolts. When these bolts are tightened, the guards are drawn down on the belt, holding it firmly in place on the bottom. This conveyer takes the flax seed and bolls that have been separated from the straw and passes it between the rollers 103 and 107, and discharges it into the hopper 108. The seed bolls that pass through the machine are crushed by these rollers. These rollers are metal rollers which are separated by the conveyer belt 101 which cushions the fork of the rollers and prevents the crushing of the seed.

The cutter 70 is mounted on a shaft 109 which shaft carries a pulley 110 driven by a belt 111, driven from a pulley 112 mounted on a jack shaft. Integral with the pulley 112 is a pinion 113 which meshes with the gear 85 driven by the pinion 84 that is rigid with the driving pulley 82.

The belt conveyer 73 is driven from a pulley 114 mounted on a shaft 115 on which is keyed a beveled gear 116, which in turn meshes with a beveled gear 117. The beveled gear 117 is keyed to the shaft 118, which shaft carries the roller which supports the forward end of the belt 73 and drives it. The rear end of the belt is supported on an idle roller which can be adjusted to take up the slack in the belt. On the shaft 118 is carried a pulley 119 which drives a belt, which in turn engages with a pulley 120 mounted on the shaft 121. On this shaft is mounted the beveled gear 122 which drives the beveled gear 123 mounted on the shaft 124. On the shaft 124 is mounted a pulley 125 which drives a belt 126, which belt drives the pulley 127 mounted on the shaft 128, which shaft carries the rearmost breaking roll of the lower series. This shaft also carries a pinion by which the other rollers of the lower series are driven, idler pinions being interposed between the pinions of consecutive rollers. The upper rollers are driven by the engagement of their blades or ribs with the blades or ribs of the corresponding rollers. On the shaft 128 is the pulley 129 which drives the belt 130 which in turn drives the pulley 131 on the shaft 132. The shaft 132 carries the roller that supports the conveyer belt 76 and by which the belt is driven.

It will be understood that the shaft 132 and the forward end of the conveyer belt 76 is on a lower level than the breaking rolls.

On the shaft 118 is mounted a pulley 133, which drives the belt 134, which in turn drives the pulley 135 on the shaft 136, on which shaft is mounted the rearmost breaking roll of the lower series of breaking rolls. A pinion is provided on this shaft for driving the other breaking rolls of the lower series, idler pinions being provided between the pinions of consecutive rollers. On the shaft of the foremost breaking roll of the lower series is provided the pinion 137 which drives the pinion 138 through a sprocket chain on the shaft 139. On this shaft is keyed the beveled gear 140 which drives the beveled gear 141 keyed to the shaft 142 on which is mounted a roller 143 which drives the conveyer belt 81.

At the forward end of the series of breaking rollers 78, etc., are provided two deflecting rollers 144 and 145, which turn the fiber straw and causes it to project down, one of these rollers being driven by the pinions that mesh in the same series with the breaking rollers, the other roller being driven by frictional contact therewith.

I claim:

1. In a flax threshing machine the combination of a feeding table, means for feeding straw along said table, a double series of rollers at the side of the table, one series being mounted above the plane of the table and the other series being mounted below the plane of said table and having their meeting faces substantially in the same plane with the table, said rollers operating only on the heads of the flax straw, the ends of the straw being carried along at the side of the series of rollers by the feeding means in substantially a straight line, the heads of the straw being bent back and forth as they travel a serpentine path between the rollers.

2. In a flax threshing machine the combination of a feeding table, means for feeding straw along said table, a double series of rollers at the side of the table, one series being mounted above the plane of the table and the other series being mounted below the plane of said table and having their meeting faces substantially in the same plane with the table, said rollers all rotating to feed in the same direction, the rollers in one series moving faster than the rollers in the other series, said rollers operating to rub the flax seed out from the bolls, said rollers operating only on the heads of the flax straw, the ends of the straw being carried along at the side of the series of rollers by the feeding means in substantially a straight line, the heads of the straw being bent back and forth as they travel a serpentine path between the rollers.

3. In a flax threshing machine the combination of a feeding table, means for feeding straw along said table, a double series of rollers at the side of the table, one series being mounted above the plane of the table and the other series being mounted below the plane of said table and having their meeting faces substantially in the same plane with the table, said rollers all rotating to feed in the same direction, the rollers in one series moving faster than the rollers in the other series, said rollers operating to rub the flax seed out from the bolls, said rollers having a series of parallel grooves therein to increase the rubbing action thereon, said rollers operating only on the heads of the flax straw, the ends of the straw being carried along at the side of the series of rollers by the feeding means in substantially a straight line, the heads of the straw being bent back and forth as they travel a serpentine path between the rollers.

4. In a flax threshing machine the combination of a feeding table, means for feeding straw along said table, a double series of rollers at the side of the table, one series being mounted above the plane of the table and the other series being mounted below the plane of said table and having their meeting edges substantially in the same plane with the table, said rollers all rotating to feed in the same direction, the rollers in one series moving faster than the rollers in the other series, said rollers operating to rub the flax seed out from the bolls, each of said rollers being built up of a series of radial segmental sections, said rollers operating only on the heads of the flax straw, the ends of the straw being carried along at the side of the series of rollers by the feeding means in substantially a straight line, the heads of the straw being bent back and forth as they travel a serpentine path between the rollers, said rollers having grooves on the periphery thereof parallel to the axis, which grooves facilitate the rubbing and twisting of the heads.

5. In a flax threshing machine the combination of a feeding table, means for feeding flax straw along said table, holding the straw in a position transversely to the table with the bolls of the straw overhanging the edge of the table, an upper and lower series of rubbing rollers for rubbing the bolls of the straw as the straw moves along the table and a beater for beating the bolls after it passes from the rollers.

6. In a flax threshing machine the combination of a feeding table, means for feeding flax straw along said table, holding the straw in a position transversely to the table with the bolls of the straw overhanging the edge of the table, an upper and lower series of rubbing rollers for rubbing the bolls of the straw as the straw moves along the table, a beater for beating the bolls after it passes from the rollers, a knife operating along the edge of the table for cutting off the portion of the straw that overhangs from the table.

7. In a flax threshing machine the combination of a feeding table, means for feeding the straw along said table keeping the length of the straw positioned transversely to said table and a part of the straw overhanging the edge of the table, means for cutting off said overhanging portion of the straw while the straw is maintained in its normal transverse position, a feed belt positioned below the table to catch the straw, a series of breaking rollers at the end of said belt, to which the straw is carried by said belt, said rollers operating to break the roots from the body of the straw, said parts being arranged to keep the straw in normal parallel relation ready for baling and further treatment.

8. In a flax threshing machine the combination of a feeding table, means for conveying flax straw along said table with the straw positioned transversely to said table with its seed end overhanging the side of the table, a means for cutting off the overhanging portion of the straw while the straw is maintained in its normal transverse position, a belt mounted under the end of said table and running transversely thereto to receive the straw from said table, a series of breaking rollers at the end of said belt, said rollers operating to break the roots from the body of the straw, said parts being arranged to keep the straw in normal parallel relation ready for baling and further treatment.

9. In a flax threshing machine the combination of a feeding table, means for conveying flax straw along said table with the straw positioned transversely to said table with its seed end overhanging the side of the table, a means for cutting off the overhanging portion of the straw while the straw is maintained in its normal transverse position, a belt mounted under the end of said table and running transversely thereto to receive the straw from said table, a series of breaking rollers at the end of said belt, said rollers operating to break the roots from the body of the straw, means for feeding the straw downward in a web as it emerges from said breaking rollers, a feeding belt placed below the end of said breaking rollers and running transversely thereto and means for cutting said hanging web into sheets at regular intervals and laying the sheets on said belt, said parts being arranged to keep the straw in normal parallel relation ready for baling and further treatment.

10. In a flax threshing machine the combination of a feeding table, an endless feeding chain suspended to travel along the table and hold the straw between the outside of chain inverted and the table and drag the straw along the table in substantially a straight line, means for bending the heads of the straw back and forth at the same time.

11. In a flax threshing machine the combination of an upper and lower series of threshing rollers, means for passing the seed end of flax straw sidewise between said series of rollers and conveying the stems of the straw along at one side of the series of the rollers and out of contact therewith keeping the stems substantially parallel to the axes of the rollers, said rollers operating to bend the head of the straw back and forth as it travels a serpentine path between the rollers.

12. In a flax threshing machine the combination of an upper and lower series of threshing rollers, means for passing the seed end of flax straw sidewise between said series of rollers and conveying the stems of the straw along at one side of the series of the rollers and out of contact therewith keeping the stems substantially parallel to the axes of the rollers, said means coöperating with said rollers to cause said rollers to bend the head of the straw back and forth as it travels a serpentine path between the rollers, a belt conveyer mounted to travel below the lower series of rollers to collect the seed thereon, a roller over which said belt conveyer travels, the second roller coöperating therewith to crush the seed bolls conveyed by said belt.

13. In a flax threshing machine the combination of an upper and lower series of threshing rollers, means for passing the seed end of flax straw sidewise between said series of rollers, the rollers of the upper series being staggered with relation to the rollers of the lower series and turning at a different velocity therefrom and having both a crushing and rubbing action on the material passed between the two series, the rollers of the lower series being spaced apart to permit the seed to fall through as fast as separated, said means coöperating with said rollers to cause said rollers to bend the head of the straw back and forth as it travels a serpentine path between the rollers.

14. A roller for a flax threshing machine built up of a series of radial segmental sections, said sections making close contact with each other forming, with the supporting shaft, a solid roller.

15. A roller for a flax threshing machine built up of a series of radial segmental sections, said roller having a series of parallel grooves therein, one between each of the consecutive sections, said sections making close contact with each other forming, with the supporting shaft, a solid roller.

In testimony whereof I affix my signature.

JAMES SIDNEY STARLING.